United States Patent [19]
Kumar et al.

[11] Patent Number: 5,691,625
[45] Date of Patent: Nov. 25, 1997

[54] USING SENSED STATOR TERMINAL VOLTAGES FOR DETERMINING ALTERNATOR ROTOR POSITION FOR CRANKING AN ENGINE

[75] Inventors: Ajith Kuttannair Kumar; Thomas Detlor Stitt, both of Erie, Pa.

[73] Assignee: General Electric Company, Schenectady, N.Y.

[21] Appl. No.: 718,033

[22] Filed: Sep. 23, 1996

[51] Int. Cl.⁶ .................................................. H02P 6/00
[52] U.S. Cl. ................................ 322/20; 322/28; 322/36; 318/701; 318/721
[58] Field of Search ........................... 322/10, 20, 28, 322/36; 318/701, 721

[56] References Cited

U.S. PATENT DOCUMENTS

| | | | |
|---|---|---|---|
| 4,364,004 | 12/1982 | Bourbeau | 318/721 |
| 4,585,982 | 4/1986 | Cooper et al. | 318/723 |
| 4,585,983 | 4/1986 | Cooper et al. | 318/723 |
| 5,051,680 | 9/1991 | Belanger | 318/701 |
| 5,229,700 | 7/1993 | Stitt et al. | 318/618 |
| 5,363,039 | 11/1994 | Kumar et al. | 324/158.1 |
| 5,384,527 | 1/1995 | Rozman et al. | 322/10 |
| 5,493,195 | 2/1996 | Heglund et al. | 318/701 |
| 5,495,162 | 2/1996 | Rozman et al. | 322/10 |
| 5,512,811 | 4/1996 | Latos et al. | 322/10 |

OTHER PUBLICATIONS

Serial No. 08/516,079 (GE docket No. 20-LC-1823), "Use of Traction Inverter for Cranking the Engine in an AC Locomotive", AK Kumar; RF Griebel, filed Aug. 17, 1995.

Primary Examiner—Steven L. Stephan
Assistant Examiner—Nicholas Ponomarenko
Attorney, Agent, or Firm—Jill M. Breedlove; Marvin Snyder

[57] ABSTRACT

A system for determining rotor position of an n-phase alternator driven by an inverter uses as inputs the stator terminal voltages of the alternator with respect to the negative power bus, which are already also provided as inputs to the inverter, and provides as outputs simulated rotor positions states. The simulated rotor position states are provided to one or more inverter controllers which, in turn, provide firing signals to one or more corresponding inverters which are used to crank an engine, e.g., an internal combustion engine of a diesel electric locomotive.

2 Claims, 5 Drawing Sheets

1

USING SENSED STATOR TERMINAL VOLTAGES FOR DETERMINING ALTERNATOR ROTOR POSITION FOR CRANKING AN ENGINE

FIELD OF THE INVENTION

The present invention relates generally to detecting rotor position of an inverter-driven alternator, and, more particularly, to using sensed stator terminal voltages to determine alternator rotor position which, in turn, is used for providing firing signals to the inverter for cranking an engine, e.g., an internal combustion engine of a diesel electric locomotive.

BACKGROUND OF THE INVENTION

Current-fed third-harmonic inverters are typically used for supplying variable frequency alternating current to three-phase stator windings of rotatable synchronous machines such as of a type used to start or "crank" a prime mover, such as a large internal combustion engine. In such a system, the rotor of the machine is coupled to a mechanical load comprising the crankshaft of the engine. Initially, the output torque of the rotor (and hence the magnitude of current in the stator windings) needs to be relatively high in order to start turning the crankshaft. As the rotor accelerates from rest, less torque (and current) is required, and the fundamental frequency of load current increases with speed. In its cranking mode of operation, the inverter supplies the machine with current of properly varying magnitude and frequency until the engine crankshaft is rotating at a rate that equals or exceeds the minimum speed at which normal running conditions of the engine can be sustained.

Presently available inverter cranking controls use hardware for comparing each of the three phases with respect to the alternator's neutral. For each phase, a digital signal is generated depending on whether the filtered phase voltage with respect to neutral is positive or negative. The digital inputs define the alternator's rotor position. The cranking control advances the firing of the inverter based on the position of the rotor as it turns. Such controls are described in U.S. Pat. Nos. 4,585,982 and 4,585,983 of Charles E. Cooper and Thomas D. Stitt, both of which are assigned to the instant assignee.

Although the cranking controls described hereinabove are suitable for cranking an engine, it is desirable to simplify the inverter cranking controls and reduce the parts count by eliminating the need for hardware detection of alternator rotor position.

SUMMARY OF THE INVENTION

A system for determining rotor position of an n-phase alternator driven by an inverter advantageously eliminates the hardware used in presently available rotor position detection systems. The rotor position sensor of the present invention uses as inputs the stator terminal voltages of the alternator with respect to the negative power bus, which are already also provided as inputs to the inverter, and provides as outputs simulated rotor positions states.

In operation, the rotor position sensor calculates the simulated alternator neutral voltage by adding the stator terminal voltages and dividing by n, and then determines the stator terminal voltages with respect to the simulated alternator neutral voltage by subtracting the simulated alternator neutral voltage from each respective stator terminal voltage. A filter/clamp circuit filters and clamps the stator terminal voltages with respect to the simulated alternator neutral voltage using a predetermined time constant and upper and lower voltage limits. Next, a hysteresis loop is applied to the outputs of the filter/clamp circuit to provide filtered output states plus hysteresis such that if a respective filtered output state plus hysteresis is greater than zero, then the corresponding stator state is zero; otherwise the corresponding stator state is one. The resulting stator states are combined to provide an n-bit stator state to provide a simulated rotor position state.

The simulated rotor position states are provided to one or more inverter controllers which, in turn, provide firing signals to one or more corresponding inverters which are used to crank an engine, e.g., an internal combustion engine of a diesel electric locomotive.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The electrical cranking control system according to the present invention is described herein with respect to a diesel electric locomotive engine for purposes of illustration only. The principles of the present invention are applicable to any suitable inverter cranking control.

Figure 1:
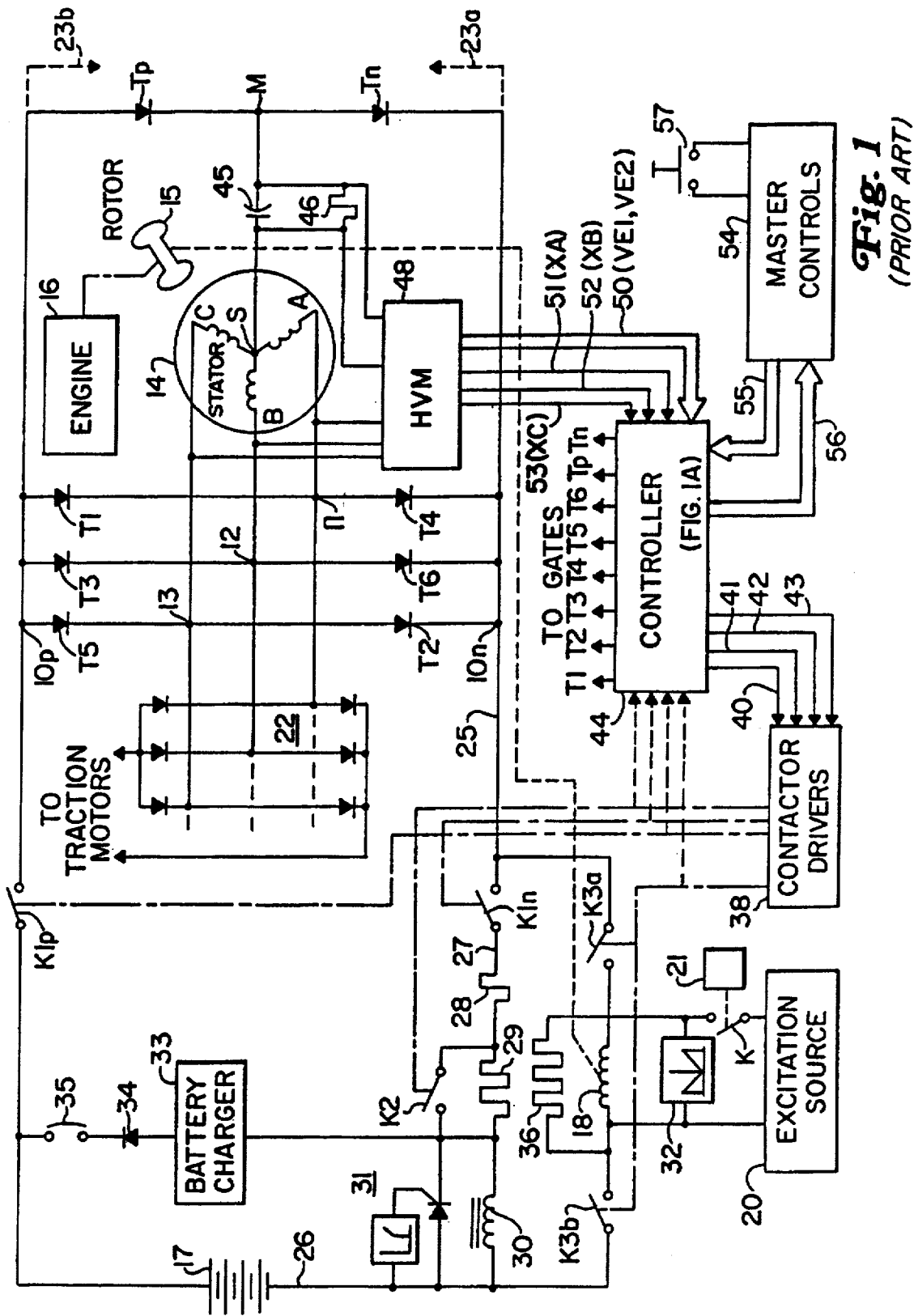
FIG. 1 schematically illustrates, partially in block diagram format, a typical electrical power system for a diesel electric locomotive.

FIG. 1 illustrates an electric power system for a diesel electric locomotive comprising a third harmonic auxiliary impulse commutated inverter having a pair of dc terminals 10p and 10n connected to a source of relatively smooth direct current and a set of three ac terminals 11, 12, and 13 connected, respectively, to line terminals of three star-connected armature windings on the stator of a rotatable, variable speed, three-phase ac synchronous machine 14, sometimes referred to herein as a traction alternator. Synchronous machine 14 has a rotor 15 that is mechanically coupled to a prime mover 16. The current source for the inverter comprises the combination of a source of voltage, such as a heavy duty electric storage battery 17, in series with an impedance which has appreciable electrical inductance, preferably provided by a dc field winding 18 on rotor 15 of machine 14.

By way of example, battery 17 is a lead-acid or nickel-cadmium type having thirty-two cells and rated 68 volts; and the average magnitude of voltage at its terminals normally does not exceed 76 volts. Its internal resistance is typically in the range of 16 to 37 milliohms. The battery is intended to supply electrical energy for starting the prime mover, and the system shown in FIG. 1 can successfully perform this function with the battery voltage as low as 61 volts.

Prime mover 16 can be a conventional thermal or internal combustion engine such as a high-horse-power, sixteen-cylinder diesel engine that is used to provide the motive power on a large self-propelled diesel-electric traction vehicle such as a locomotive.

Synchronous machine 14 has dual modes of operation, that is, as a generator for supplying alternating current to an electric load circuit that is connected to its stator windings; and as an ac motor for cranking, or starting, engine 16. In its generating mode, rotor 15 of the machine is driven by the crankshaft of engine 16, and field winding 18 is energized by a suitable excitation source 20 (e.g., the rectified output of auxiliary windings on the stator of machine 14) to which it is connected by means of a suitable contactor K which is closed by a conventional actuating mechanism 21 on command.

Synchronous machine 14 generates alternating voltages at the line terminals of its three-phase stator windings. The rms magnitude of the fundamental sinusoidal components of these voltages depends on the angular velocity (rpm) of the rotor and on the amount of field excitation. The generated voltages are applied to ac input terminals of at least one three-phase, double-way rectifier bridge 22, and the rectified electric power at the output terminals of each such bridge is supplied to positive and negative dc busses for distribution to traction motors (not shown) of the vehicle. As shown in FIG. 1, bridge 22 comprises simple solid-state diodes, but alternatively it could be a controlled rectifier, if desired. As is suggested by broken lines 23a and 23b, multiple traction motors (not shown) could be connected to receive power from the dc terminals 10p and 10n, if desired.

In the motoring mode of operation, rotor 15 of synchronous machine 14 drives the crankshaft of engine 16. Electrical energy is supplied from battery 17 to the windings on both the rotor and the stator of the machine, and rotor 15 generates torque to run the crankshaft and thereby crank the engine. As the rotor accelerates from rest, both the frequency and the rms magnitude of the fundamental alternating voltage waveforms developed at the line terminals of the stator windings (i.e., the back emf) correspondingly increase, while load current (i.e., current in the field and armature windings) decreases in magnitude. Once the rotor is rotating faster than a predetermined rate, which typically is 240 rpm, the engine is presumed to be started and the motoring mode (i.e., engine cranking mode) of operation is discontinued. Assuming that machine 14 has ten poles, 240 rpm corresponds to a fundamental frequency of 20 Hertz. Thus, the fundamental frequency of alternating current supplied to the stator windings of machine 14 needs to increase from zero to approximately 20 Hertz in order for the illustrated system to perform its engine starting function.

The third harmonic auxiliary impulse commutated inverter is operative to convert direct current from battery 17 into variable frequency alternating currents in the three different phases A, B, and C of the three-phase armature windings on the stator of machine 14. The inverter has at least three pairs of alternately conducting main controllable electric valves interconnected and arranged in a three-phase, double-wye bridge configuration between the set of three ac terminals 11, 12, and 13 and the pair of dc terminals 10p and 10n. More particularly, a first pair of valves T1 and T4 are connected in series-aiding fashion from terminal 10p to terminal 10n, and their juncture, comprising terminal 11, is connected to phase A of the stator windings; a second pair of valves T3 and T6 are connected in series-aiding fashion from 10p to 10n, and their juncture, comprising terminal 12, is connected to phase B of the stator windings; and a third pair of valves T5 and T2 are connected in series-aiding fashion from 10p to 10n, and their juncture, comprising terminal 13, is connected to phase C. Each valve preferably comprises at least one solid state unidirectional controlled rectifier popularly known as a thyristor which has a turned on (conducting) state and a turned off (non-conducting) state. In practice, the valves are respectively shunted by conventional snubber circuits (not shown).

The first dc terminal 10p is connected to the relatively positive terminal of battery 17 via a single pole contactor K1p, and the second dc terminal 10n is connected to the other terminal of the battery by means of a conductor 25, one pole K3a of a double-pole contactor K3, the other pole K3b of the same contactor, and a conductor 26. Field winding 18 typically has a resistance in the range of 0.12 to 0.28 ohm and an unsaturated inductance of more than 0.3 henry. A single-pole contactor K1n, a conductor 27, and resistance means comprising two resistors 28 and 29 are connected in parallel with field winding 18 in the load current path between conductors 25 and 26. Resistors 28 and 29 are connected in series, and both have very low ohmic values; for example, the resistance of resistor 28 is approximately 14 milliohms; and the resistance of resistor 29 is shunted by another single-pole contactor K2 which, when closed, reduces the ohmic value of the resistance means to that of the first resistor 28 alone.

An inductor 30 of approximately one millihenry inductance is connected in series with resistors 28 and 29 between second resistor 29 and conductor 26 in order to smooth the current flowing in this branch of the load current path. Inductor 30 is shunted by a conventional overvoltage protective device 31, the resistance of which is normally very high, but automatically decreases to a negligible amount in substantially instantaneous response to the magnitude of voltage across the inductor rising to a predetermined breakover level (e.g., 750 volts). A similar protective device 32 with bidirectional response is connected across field winding 18. A resistor 36 of significant ohmic value (e.g., 100 ohms) is also connected across field winding 18 to enable thyristor "latching" current to bypass the field and inductor 30 when battery current starts flowing to precharge the inverter's commutation capacitor 45.

As is shown in FIG. 1, a battery charger 33, in series with a blocking diode 34 and a circuit breaker 35, is connected across the combination of battery 17 and inductor 30. With engine 16 running under steady-state conditions, the battery charger holds the battery voltage at approximately 74 volts. It can be energized from any suitable source, such as auxiliary windings (not shown) on the stator of synchronous machine 14.

With field winding 18 in the load current path during engine cranking, synchronous machine 14 will operate with a characteristic similar to that of a series dc motor, namely, high current and hence desirably high starting torque, at low speeds. The resistance means 28 and 29 in parallel with the field reduces the ohmic value of resistance that the field winding alone would otherwise introduce in this path, thereby initially allowing a higher magnitude of armature current and later, as speed increases, providing automatic field weakening which permits the machine to run at a higher speed. Initially, load current is limited by the internal resistance of battery 17 as well as other resistance in its path and as speed increases, it is limited by the back emf of the armature (i.e., stator) windings. Thus, load current and torque tend to decrease with increasing speed. A short time after cranking commences, contactor K2 is closed to further reduce the amount of resistance in parallel with the field, thereby permitting more load current to flow and hence more torque to be developed at higher speeds as compared to the quantities that would be achieved if the parallel resistance were not so reduced.

When the cranking mode of operation commences, contactor K is open, and all of the contactors in the load current path between battery 17 and dc terminals 10p and 10n are closed, except K2. Contactor K2 is commanded to close upon the expiration of a predetermined length of time after cranking commences. Thereafter, in response to the speed of the engine attaining a threshold that marks the conclusion of cranking (e.g., 240 rpm), and therefore the successful starting of the engine 16, all of the previously closed contactors are opened. Upon opening contactor K3, field winding 18 is disconnected from the load current path between conductors 25 and 26, and contactor K is then closed by its actuating mechanism 21 in order to reconnect the field to the normal excitation source 20.

Each of the four contactors K1p, K1n, K2, and K3 has an associated actuating mechanism that determines its closed or open status. All four such mechanisms are represented in FIG. 1 by a single block 38 labeled "Contactor Drivers," and they respectively respond to opening/closing signals received over lines 40, 41, 42, and 43 from another block 44 labeled "Controller." The controller 44 knows the actual status of each contactor by virtue of feedback signals that it receives from conventional position indicators (not shown) that are associated with the separable contact members of the respective contactors, as represented symbolically by broken lines in FIG. 1.

In order to turn on each of the controllable valves T1 through T6 in the inverter, an appropriate signal is applied to the associated gate while the main electrodes of the respective valve are forward biased (i.e., anode potential is positive with respect to cathode). Such a signal is sometimes called a trigger or gating signal, and is herein referred to generically as a "firing signal." Controller 44 cyclically produces a series of periodic firing signals for turning on the respective main valves T1-T6 in numerical order. (It is assumed that the alternating voltages developed at the line terminals of the 3-phase stator windings of the machine 14 have the conventional A-B-C phase rotation.) In order to quench, or turn off, each valve when desired, the inverter has a forced commutation circuit including at least first and second auxiliary controllable electric valves Tp and Tn interconnected in series-aiding fashion between dc terminals 10p and 10n and connected via commutation capacitor 45 to the stator windings of machine 14. Capacitor 45 is shunted by a bleeder resistor 46 which effectively keeps the capacitor initially in a substantially discharged state prior to closing contactors K1p and K1n and starting up the illustrated system. Preferably, the commutation capacitor is connected between the juncture M of the auxiliary valves and the neutral S of the three star-connected stator windings.

The main valves T1-T6, in turn, are forced to turn off by the commutation action that is initiated each time one or the other of the auxiliary valves Tp and Tn is turned on. Controller 44 is arranged cyclically to produce a series of periodic firing signals for alternately turning on the two auxiliary valves in synchronism with the variable frequency fundamental component of the sinusoidal phase-to-phase alternating voltages that are developed at the line terminals of the respective phases A, B, and C of the stator windings as field winding 18 rotates inside the stator of machine 14. Note that the peak magnitude of reverse voltage imposed on the auxiliary valves can be reduced, if desired, by respectively inserting simple diodes in series therewith.

To produce the valve firing signals at appropriate times, controller 44 receives information or data from the power system indicating when the fundamental waveforms of line-to-neutral magnetic flux in the three phases A, B and C of the machine 14 cross zero and change polarity, and indicating the status of the electrostatic charge or voltage on the commutation capacitor 45. Such data are supplied by means of a high voltage module (HVM) 48 which has a plurality of input wires respectively connected to the line terminals of the stator windings and to opposite terminals of capacitor 45. Inside HVM 48, there is bistable first means for sensing the electrical potential difference across commutation capacitor 45. Whenever the potential at juncture M is measurably positive with respect to the neutral S, the bistable first means is in one state and provides a discrete signal (VE1) that is high or "1," but when this potential is measurably negative with respect to neutral, the first means is in a different state in which the output signal VE1 is low or "0." Voltage sensors suitable for this purpose are well known and readily available to a person skilled in the art. The signal VE1 is supplied over an output bus 50 to controller 44. An additional bistable voltage sensing means is provided in HVM 48 for detecting whether or not the capacitor voltage has a magnitude exceeding a predetermined level, either positive or negative. In one practical application of the illustrated system, the predetermined level is 400 volts. The additional sensor produces a discrete signal (VE2) on output bus 50. As the commutation capacitor charges or recharges to a voltage magnitude in excess of the predetermined level, the signal VE2 changes from a "0" to a "1" state.

HVM 48 also includes suitable means for integrating the respective line-to-neutral voltages of the stator windings and for indicating whether the polarity of the integral is positive or negative. The latter means provides three discrete output signals XA, XB and XC which are respectively supplied over lines 51, 52 and 53 to controller 44. The output signal XA is high or "1" only during the half cycles in which the time integral of the voltage between the line terminal of phase A and the neutral S is relatively positive. It will be apparent that up and down changes of XA coincide with successive zero crossings of both the magnitude of line-to-neutral flux in phase A and the magnitude of the fundamental phase-to-phase alternating voltage developed at the stator line terminals of phases C and B (i.e., the line terminals to which the AC terminals 13 and 12 of the inverter are respectively connected). Similarly, the output signal XB is "1" only during the half cycles in which the integral of the phase B-to-neutral voltage is relatively positive, whereby up and down changes of XB coincide with successive zero crossings of both the magnitude of line-to-neutral flux in phase B and the magnitude of the fundamental phase-A-to-phase-C alternating voltage developed at the stator line terminals to which the AC terminals 11 and 13 are connected. In a similar manner, the output signal XC is "1" only during the positive half cycles of the integral of the phase C-to-neutral voltage, whereby the up and down changes of XC coincide with successive zero crossings of both the magnitude of line-to-neutral flux in phase C and the magnitude of the fundamental phase-B-to-phase-A alternating voltage developed at the stator line terminals to which AC terminals 12 and 11 are respectively connected. By logically processing the resulting output signals XA, SB, and SX, the six different combinations (i.e., rotor position states) of relative polarities of the three phase-to-phase voltages are indicated during each cycle of operation. Each time the magnitude of any of these voltages crosses zero, a different one of the output signals changes either from 0 to 1 or from 1 to 0.

The controller 44 also communicates with master controls 54 via input and output busses 55 and 56. A starting switch 57 is associated with the master controls 54. The starting switch 57 can be either a pushbutton type or a turn-and-hold type.

Figure 2:
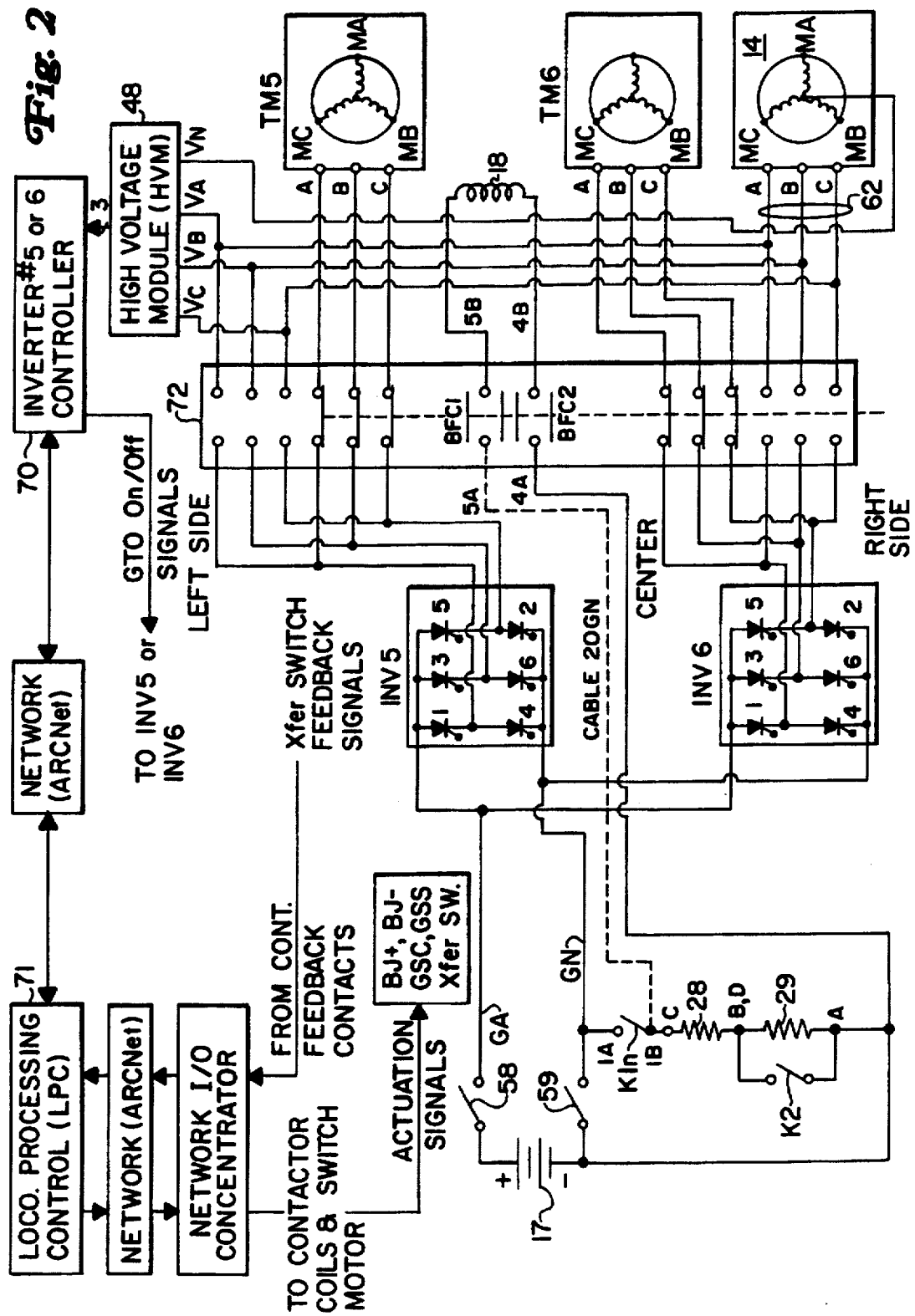
FIG. 2 schematically illustrates an electrical cranking system of a type using traction inverters for cranking an engine of a locomotive.

FIG. 2 illustrates a system for cranking the internal combustion engine of a locomotive, the cranking system being of a type described in U.S. patent application Ser. No. 08/516,079 of A. K. Kumar and R. F. Griebel, filed Aug. 17, 1995, assigned to the instant assignee and incorporated by reference herein, wherein the traction inverters are used for cranking the engine of a diesel electric locomotive. By way of illustration, the system of FIG. 2 shows two traction motors TM5 and TM6 of a six traction motor (TM1–TM6) system. Each traction motor is connected to a corresponding inverter INV5 and INV6. Each inverter comprises a plurality of controllable electric valves, preferably gate turn-off (GTO) devices, which can be gated into and out of conduction by application of a control signal to their respective gate terminals. The electric valves of each of the inverters is controlled by gate signals supplied by respective inverter controllers 70, only one of which is shown in FIG. 2. Each of the inverter controllers is connected to receive signals from a locomotive processing controller 71.

Power to each of the inverters is provided by respective positive and negative dc busses GA and GN, respectively. Onboard locomotive battery 17 is connected between bus GA and bus GN by respective contactors 58 and 59.

As shown in FIG. 2, a transfer switch 72 is provided in the output line of one or more of the inverters between the inverter and its corresponding traction motor. In the embodiment of FIG. 2, the transfer switch is connected between each illustrate traction motor TM5 and TM6, respectively, and the corresponding inverters INV5 and INV6, respectively. Transfer switch 72 is a conventional three-phase switching device which simultaneously switches three separate lines from inverter INV5 to traction motor TM6 and from inverter INV6 to traction motor TM6. The transfer switch may be manual, pneumatic, hydraulic, electric, or any other suitable type of multiphase electrically operated switch.

In the normal mode of operation, transfer switch 72 is conditioned such that the output lines from inverter INV5 are connected to the stator winding terminals of traction motor TM5 and the output lines of inverter INV 6 are connected to the stator winding terminals of traction motor TM6. During cranking operation of the locomotive, the transfer switch is changed from its normal configuration such that the output lines from inverter INV5 or from inverter INV6 are connected to three-phase output lines 62 which are coupled back to the stator output lines of the traction alternator 14. In this mode, the traction motors TM5 and TM6 are disconnected from their respective inverters. In this cranking mode of operation, the output from either the inverter INV5 or inverter INV6 is supplied on lines 62 to the stator windings of traction alternator 14 to effect rotation of the rotor of the machine so that the diesel engine can be cranked. In this manner, the inverters which normally supply power to the motors are used to crank the diesel engine and thus avoid the need for a separate inverter dedicated to the cranking function. The system of FIG. 2 also provides for multiple inverters for supplying power to the traction alternator 14 although only one inverter at a time may be used. This provides redundancy in case of an inverter failure.

In the cranking mode, concurrently with the contact arms of the transfer switch connecting the respective output terminals of inverter INV5 and/or inverter INV6 to the respective stator winding terminals of traction alternator 14, battery switch 58 is closed to connect the positive terminal of battery 17 to the positive bus GA. The negative battery terminal switch 59 is opened. Switches K2 and K1n can be used to place resistors 28 and 29 in parallel with field 18 for field weakening purposes, as described with reference to FIG. 1.

Once the engine has been cranked, transfer switch 60 is switched to its primary position so that the outputs of inverters INV5 and INV6 are connected to the respective stator terminals of the corresponding traction motors TM5 and TM6, respectively. Concurrently, field current can be supplied from a suitable field excitation source, e.g., the rectified output of auxiliary windings on the stator of machine 14.

Figure 3:
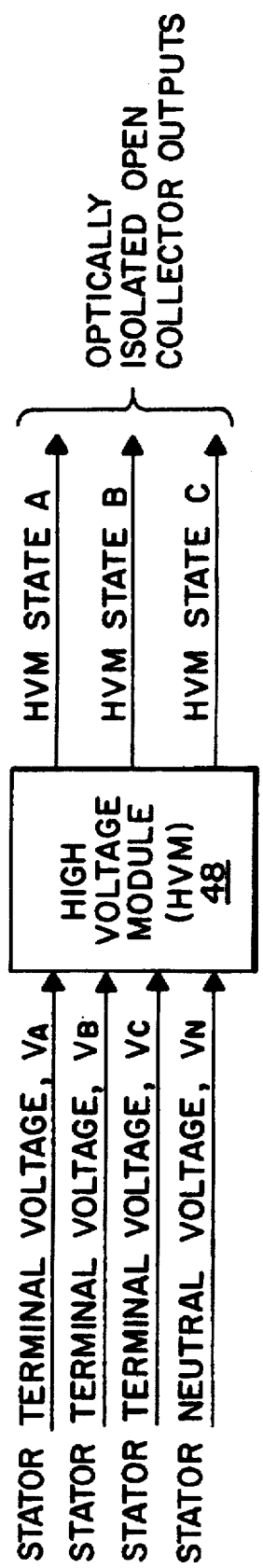
FIG. 3 is an input/output diagram for the high voltage module of the cranking system of FIG. 2.
Figure 4:
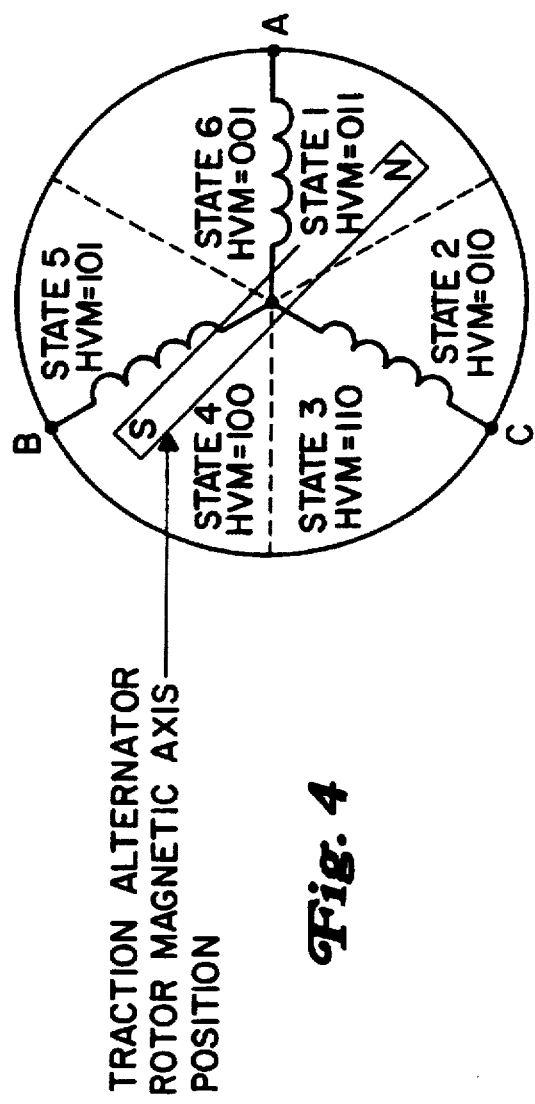
FIG. 4 is a state diagram illustrating rotor position versus high voltage module state inputs for an electrical cranking system such as that of FIG. 2.

FIG. 3 illustrates detection of alternator position by HVM 48. In particular, HVM 48 receives stator terminal voltages $V_A$, $V_B$, $V_C$, and the stator neutral voltage $V_N$ and provides as outputs HVM State A, HVM State B, and HVM State C corresponding to traction alternator stator phases. As explained hereinabove, each HVM state is a "1" or "0." FIG. 4 shows how the outputs of HVM 48 are converted to rotor position states indicating the position of the rotor. Specifically, states 1 through 6 refer to the rotor state, i.e., position, based on the HVM state C, B, A inputs, respectively. For example, HVM=100 (i.e., C=1, B=0, and A=1) corresponds to rotor state 4. The inverter controller generates its firing commands based on the feedback states from HVM 48.

In accordance with the present invention, the high voltage module (HVM 48) is advantageously eliminated. In particular, the electrical cranking system of the present invention derives simulated HVM input signals from sensed stator terminal voltages with respect to dc minus, which are also inverter inputs, and converts these signals to pseudo phase-to-neutral signals, filters and applies hysteresis to these signals, and thereby creates the equivalent signals that the HVM formerly provided for engine cranking.

Figure 5:
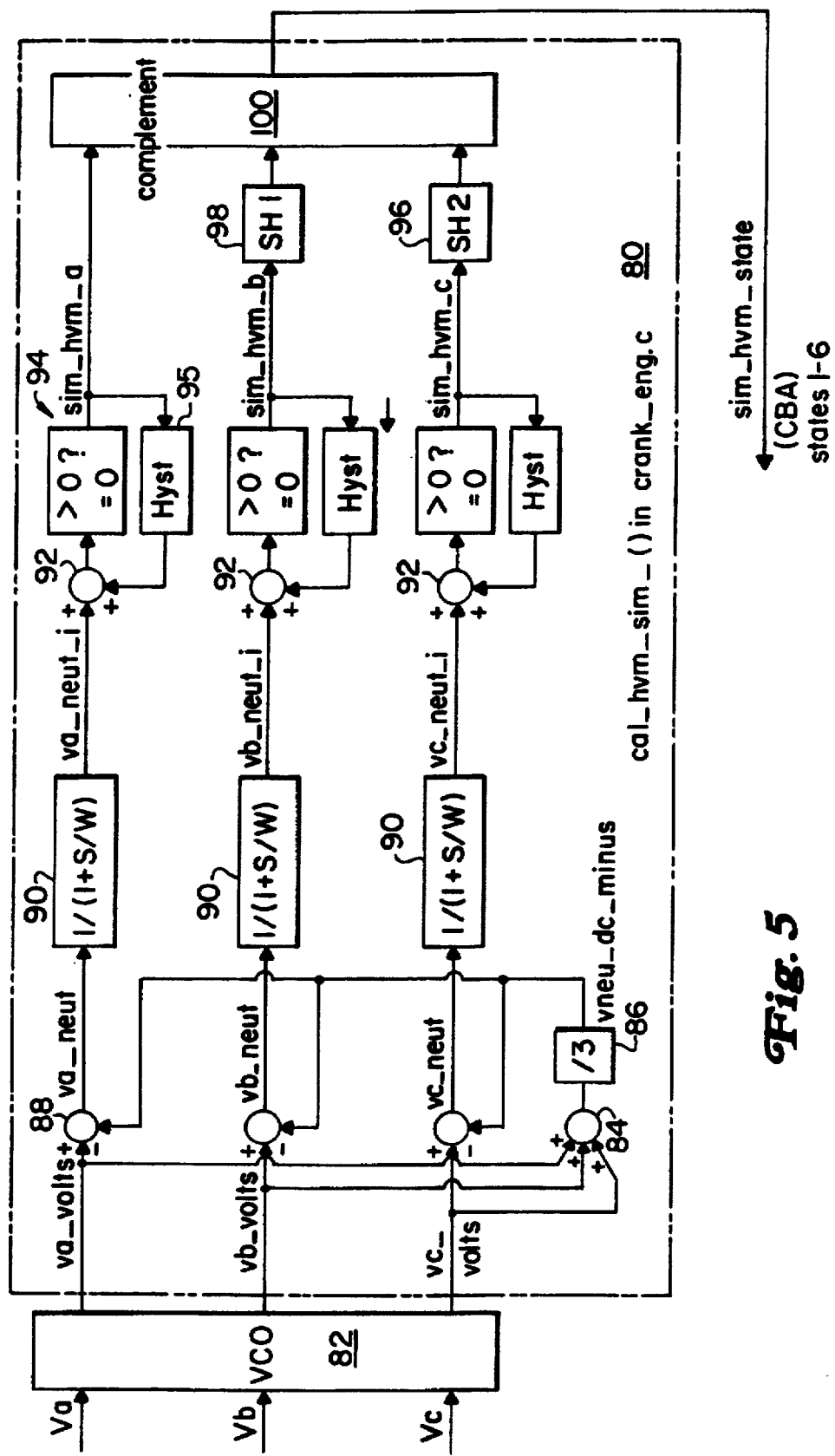
FIG. 5 is a block diagram illustrating generation of simulated rotor position states by an electrical cranking system according to the present invention.
Figure 6:
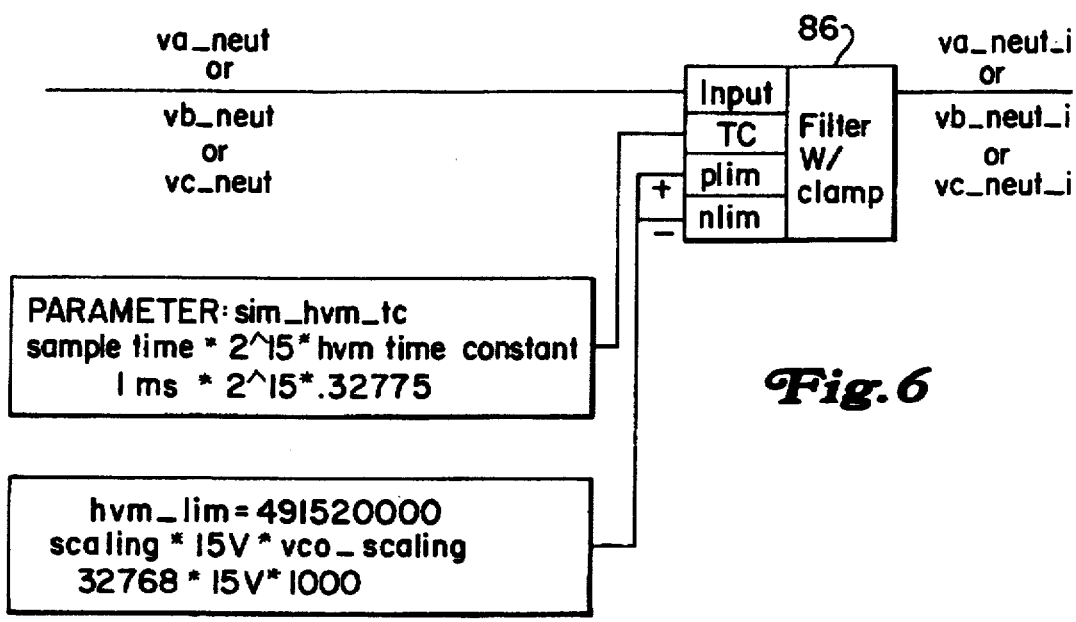
FIG. 6 is a block diagram illustrating the filter/clamp circuit of the system of FIG. 5.

FIG. 5 illustrates an HVM simulated state calculator 80 in accordance with the electrical cranking system of the present invention for generating simulated HVM input signals from the sensed stator terminal voltages $V_a$, $V_b$, $V_c$, i.e., with respect to dc minus. As shown, the sensed stator terminal voltages $V_a$, $V_b$, $V_c$ are converted by a software subroutine VCO 82, which simulates a voltage-controlled oscillator, into va, vb and vc volts. Operation of a VCO is well-known, an exemplary VCO being described in commonly assigned U.S. Pat. No. 5,229,700 of T. D. Stitt, P. R. Cooke and A. K. Kumar, issued Jul. 20, 1993 and incorporated by reference herein. The signals va, vb and vc volts are added in a summer 84, the sum being divided by three in a divider 86 to provide the simulated alternator neutral voltage vneut__dc__minus as follows:

$$vneut\_dc\_minus=(va\_volts+vb\_volts+vc\_volts)/3.$$

Each signal va, vb and vc volts is with respect to the negative battery terminal, so they are compared to the equivalent of the alternator neutral in comparators 88 as follows:

$va\_neut=va\_volts-vneut\_dc\_minus;$ $vb\_neut=vb\_volts-vneut\_dc\_minus;$ $vc\_neut=vc\_volts-vneut\_dc\_minus.$ These voltages are filtered with a time constant T (sim_ hvm_tc, e.g., T=0.32775 sec) and limited to, for example, +/−15 V (hvm_lim) in filter/clamp circuit 90 as follows:

$va\_neut\_i=va\_neut/(1+s/W);$ $vb\_neut\_i=vb\_neut/(1+s/W);$ $vc\_neut\_i=vc\_neut/(1+s/W),$ where W=3.05 rad/sec (0.4854 Hertz). FIG. 5 illustrates filter/clamp circuit 90 in more detail.

The outputs of the filter/clamp circuits are provided, respectively, to summers 92 and compared in hysteresis loops 94 such that if the filtered outputs plus hysteresis 95 are greater than 0, then the corresponding output sim_a_ hvm, sim_b_hvm, sim_c_hvm is 0; otherwise, it is a 1, as follows:

if $(va\_neut\_i+hyst\_a)>0$, then $sim\_hvm\_a=0$, else $sim\_hvm\_a=1$;

if $(vb\_neut\_i+hyst\_b)>0$, then $sim\_hvm\_b=0$, else $sim\_hvm\_b=1$;

if $(vc\_neut\_i+hyst\_c)>0$, then $sim\_hvm\_c=0$, else $sim\_hvm\_c=1.$

The hysteresis is added when the sim_hvm_a or sim_ hvm_b or sim_hvm_c output changes, otherwise it is reduced to zero by dividing it by two every time the routine is run. The initial hyst_a and hyst_b and hyst_c values are 0.7 volts, for example.

The output sim_hvm_c is shifted left 2 in block 96, and the output sim_hvm_b is shifted left 1 in block 98. The final simulated rotor position state output sim_hvm_state is determined by combining the outputs of blocks 96 and 98 with sim_hvm_a and complementing the result in block 100 as follows:

$sim\_hvm\_state=\sim[SHL2(sim\_hvm\_c)+SHL1(sim\_hvm\_b)+sim\_hvm\_a].$

This inversion is done to match the existing HVM inputs. The normal range of values for sim_hvm_state is in the range 1 through 6, corresponding to states 1 through 6.

Advantageously, therefore, the present invention provides a way of detecting the alternator rotor position while eliminating the high voltage module by using existing phase to dc minus sensors used for normal traction inverter control, hence simplifying and reducing the parts count for a cranking control system using a traction inverter.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for determining rotor position of an n-phase alternator driven by an inverter, the alternator having a stator and a rotor and, in operation, having n stator terminal voltages and a neutral voltage, the inverter being connected between relatively positive and negative power busses, the method comprising the steps of:

sensing the stator terminal voltages of the alternator with respect to the negative power bus;

calculating the alternator neutral voltage by adding the stator terminal voltages and dividing by n;

determining the stator terminal voltages with respect to the alternator neutral voltage by subtracting the alternator neutral voltage from each respective stator terminal voltage;

filtering and clamping the stator terminal voltages with respect to the alternator neutral voltage using a predetermined time constant and upper and lower voltage limits;

applying a hysteresis loop to the outputs of the filtering and clamping step to provide filtered output states plus hysteresis such that if a respective filtered output state plus hysteresis is greater than zero, then the corresponding stator state is zero, otherwise the corresponding stator state is one; and combining the resulting stator states to provide a simulated rotor position state.

2. A system for determining rotor position of an n-phase alternator driven by an inverter, the alternator having a stator and a rotor and, in operation, having n stator terminal voltages and a neutral voltage, the inverter being connected between relatively positive and negative power busses, comprising:

voltage sensors for sensing the stator terminal voltages of the alternator with respect to the negative power bus;

a circuit for calculating the alternator neutral voltage by adding the stator terminal voltages and dividing by n;

a comparator for determining the stator terminal voltages with respect to the alternator neutral voltage by subtracting the alternator neutral voltage from each respective stator terminal voltage;

a filter/clamp circuit for filtering and clamping the stator terminal voltages with respect to the alternator neutral voltage using a predetermined time constant and upper and lower voltage limits;

a hysteresis loop for receiving the outputs of the filter/clamp circuit to provide filtered output states plus hysteresis such that if a respective filtered output state plus hysteresis is greater than zero, then the corresponding stator state is zero; otherwise the corresponding stator state is one; and a combining circuit for combining the resulting stator states to provide a simulated rotor position state.

* * * * *